United States Patent

Pfannkuche et al.

[11] Patent Number: 5,236,338
[45] Date of Patent: Aug. 17, 1993

[54] SUPPORT MEANS FOR CURRENT CONDUCTOR RAILS

[75] Inventors: Heinz Pfannkuche, Bochum; Uwe Schulte, Wetter, both of Fed. Rep. of Germany

[73] Assignee: Mannesmann Aktiengesellschaft, Düsseldorf, Fed. Rep. of Germany

[21] Appl. No.: 661,865

[22] Filed: Feb. 27, 1991

[30] Foreign Application Priority Data

Feb. 27, 1990 [DE] Fed. Rep. of Germany ....... 4006554

[51] Int. Cl.$^5$ ............................................. B60M 1/34
[52] U.S. Cl. ............................ 191/23 A; 191/32
[58] Field of Search ............... 191/22 R, 23 R, 23 A, 191/29 R, 29 DM, 32, 45 A, 48, 49

[56] References Cited

U.S. PATENT DOCUMENTS

| | | | |
|---|---|---|---|
| 2,696,532 | 12/1954 | Herrmann et al. | 191/45 A X |
| 2,830,137 | 4/1958 | Herrmann et al. | 191/45 A X |
| 3,155,207 | 11/1964 | Blemly et al. | 191/23 A |
| 3,337,697 | 8/1967 | Martin et al. | 191/23 R |
| 3,399,281 | 8/1968 | Corl | 191/29 DM X |
| 3,892,299 | 7/1975 | Kilburg | 191/29 R |
| 4,109,768 | 8/1978 | Fromme et al. | 191/32 X |
| 4,207,821 | 6/1980 | Beckert | 104/130 X |
| 4,375,193 | 3/1983 | Sullivan | 191/45 A X |
| 4,393,785 | 7/1983 | Hortnagel | 191/32 X |
| 4,700,024 | 10/1987 | Hasselmann et al. | 191/45 A |

FOREIGN PATENT DOCUMENTS

| | | | |
|---|---|---|---|
| 1284985 | 12/1968 | Fed. Rep. of Germany ... | 191/45 A |
| 3702010 | 8/1987 | Fed. Rep. of Germany . | |
| 1314840 | 12/1962 | France | 191/32 |
| 1416220 | 9/1965 | France | 191/45 A |

Primary Examiner—Michael S. Huppert
Assistant Examiner—Scott L. Lowe
Attorney, Agent, or Firm—Horst M. Kasper

[57] ABSTRACT

A support for current conductor rails at an essentially double T-shaped beam girder is welded together of two mirror-symmetrical profiles. A support, carrying the current rails, surrounds the top flange of the beam girder (1) and rests with an angled clamping face (7) at an angled holder strap (4) of the top flange. The support (6) is held by U or V-shaped clamps (12) at the holder strap (4) of the top flange. This arrangement provides for a suitable attachment possibility for current conductor rails above the bottom flange of a double T-shaped beam girder.

14 Claims, 2 Drawing Sheets

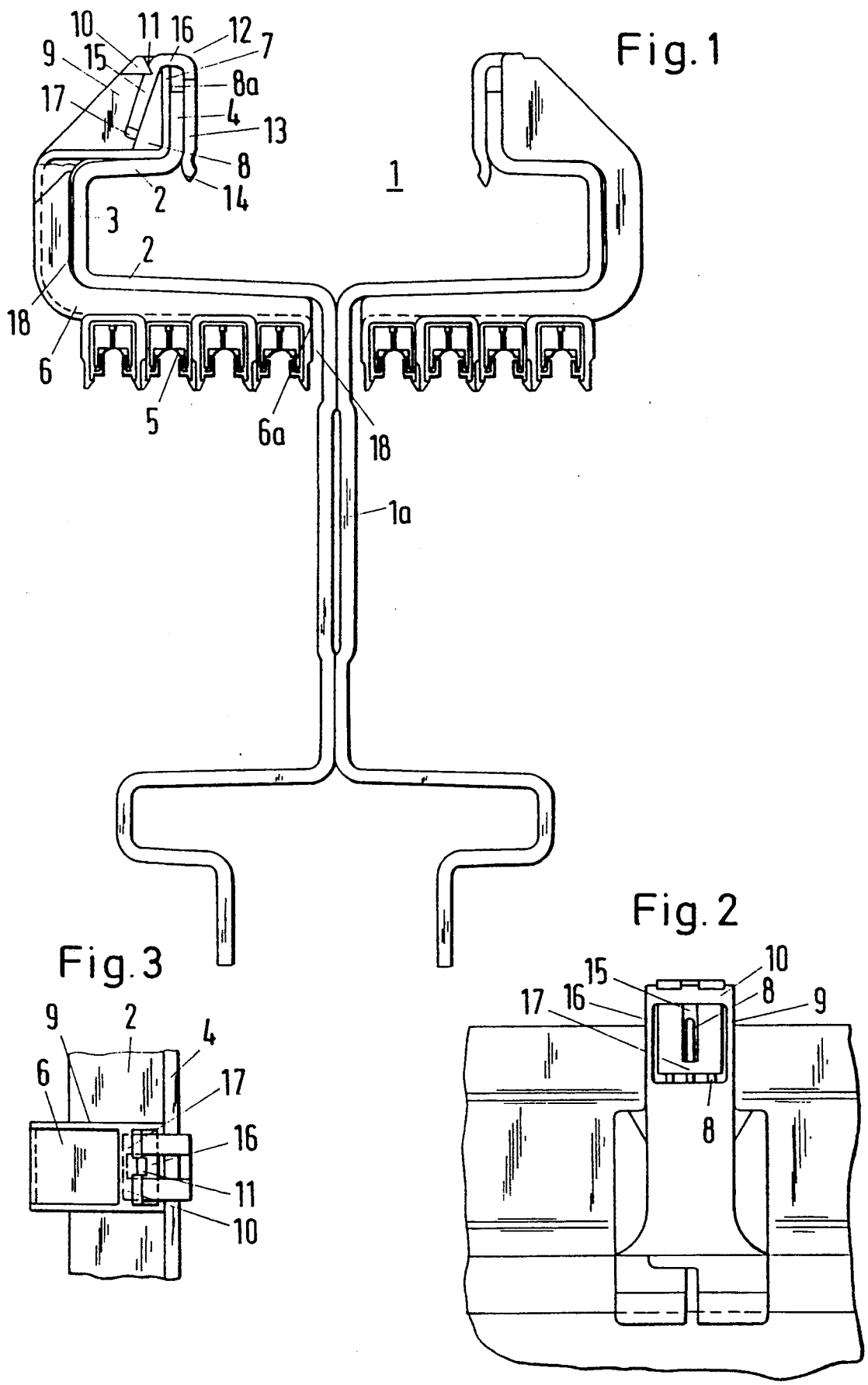

SUPPORT MEANS FOR CURRENT CONDUCTOR RAILS

BACKGROUND OF THE INVENTION

1. Field of the Invention

The invention relates to a support means for current conductor rails, where the current conductor rails are disposed at a beam girder which can be a double-T-shaped girder and which is formed by two mirror-symmetrical profiles welded together.

2. Brief Description of the Background of the Invention Including Prior Art

The current conductor rails are in general disposed at a web of a T-shaped beam girder. Trolleys, carriages, charriots, or cranes run on the upper arch or top flange of the beam girder as taught in the German Printed Patent Document DE-OS 3,702,010. There are in addition application situations, where travelling crabs are running on the lower chord of a T-shaped beam girder. In many such cases it is not advisable to dispose the current collector lines on the web of the beam girder.

SUMMARY OF THE INVENTION

1. Purposes of the Invention

It is an object of the invention to furnish a suitable attachment means for current conductor rails disposed above the runway or travelling region of the wheels of a transport means.

It is a further object of the present invention to provide attachment means for current conductor rails which are suitable for being disposed in difficultly accessible areas.

It is yet a further object of the present invention to provide a simple clamping mechanism for the attachment of current conductor rails to support girders.

These and other objects and advantages of the present invention will become evident from the description which follows.

2. Brief Description of the Invention

According to the present invention there is provided for a support means for current conductor rails. A double T-shaped beam girder is welded together from two mirror-symmetrical profiles. A support carries current conductor rails and includes an angled clamping face. A top flange of the beam girder includes an angled holder strap. The support carrying the current conductor rails surrounds the top flange of the beam girder and rests with the angled clamping face at the angled holder strap of the top flange. The support is retained by clamps at the angled holder strap of the top flange. The clamps can exhibit a U shape or a V shape.

The current conductor rails can be disposed opposite to the clamping face at the support.

An arm, formed at the clamp, can rest at the holder strap and can comprise a safety nose. The safety nose can grip under an initial edge of an upper U-shaped guide strap.

A wedge face, narrowing to a tip, can be formed at the clamping face for the rising arm of the clamp.

A slot can be furnished at the rising arm of the clamp and can extend approximately to the end of the wedge face. A safety nose can be disposed at a cross web between side angle faces of the support and can protrude into the slot.

A slot bridging web can be disposed at the rising arm. The wedge face can comprise an end edge. The end edge can reach by the thickness of the slot bridging web up to under the safety nose.

A slot can be furnished at the support and be disposed parallel to the beam girder. The clamp can be inserted into the slot of the support. The slot can be shorter than the width of the support.

An angled end can be formed at a lower end of the clamp. The arm can brace the clamp with the middle of the arm at the holder strap. Preferably, the angled end of the clamp grips under the upper U-shaped guide strap, while the rising arm presses onto the wedge face in the slot.

A first air gap can be disposed between an intermediate web of the guide strap and an area of the support adjacent to the guide strap. A second air gap can be disposed between a tip of the support and a web of the beam girder.

The clamp can be produced of steel or of spring steel.

In accordance with the invention, the support, supporting the current conductor rails, surrounds the top flange of the beam girder and rests with an angled clamping face at an angled registering or holder strap of the top flange. The support is held by U or V- shaped clamps at the top flange.

An advantage achieved according to the present invention comprises that a current conductor rail row, already mounted at the supports, can, without any problem, be disposed with the holders initially loose to a difficultly accessible beam girder and can subsequently be attached with the clamps at the angled holder strap. In this context, the current conductor rails are disposed opposite to the clamping face.

According to a further embodiment of the invention, the clamp includes an arm resting at the holder strap. The arm is furnished with a safety nose and grips under the starting edge of the U- shaped guide strap. The clamping face is furnished with a wedge face, narrowing to a tip, for the rising arm furnished with a slot. A safety nose of the support extends into a slot delimited by a slot web such that the clamp can be attached already before mounting and assembly at the support. In particular in case of difficultly accessible locations this is associated with the advantage that the clamp does not fall down during the transport and during the mounting and is brought together with the support into the assembly position.

The clamp can furthermore be insertable into a slot of the support, where said slot is disposed parallel to the beam girder, and where the slot is not as long as the width of the support. A small air gap is present between the support and the web of the holder strap as well as the beam girder web such that the somewhat springingly yielding support clampingly surrounds the U-shaped guide strap and firmly rests at the holder strap. The clamp for the support made of plastic is preferably produced from steel or thin spring steel.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention:

FIG. 1 is a front view of a beam girder with a current conductor rails and a support with clamp, partially in sections, FIG. 2 is a side elevational view of the embodiment of FIG. 1, FIG. 3 is a top view of the embodiment of FIG. 1.

DESCRIPTION OF INVENTION AND PREFERRED EMBODIMENT

Figure 4:
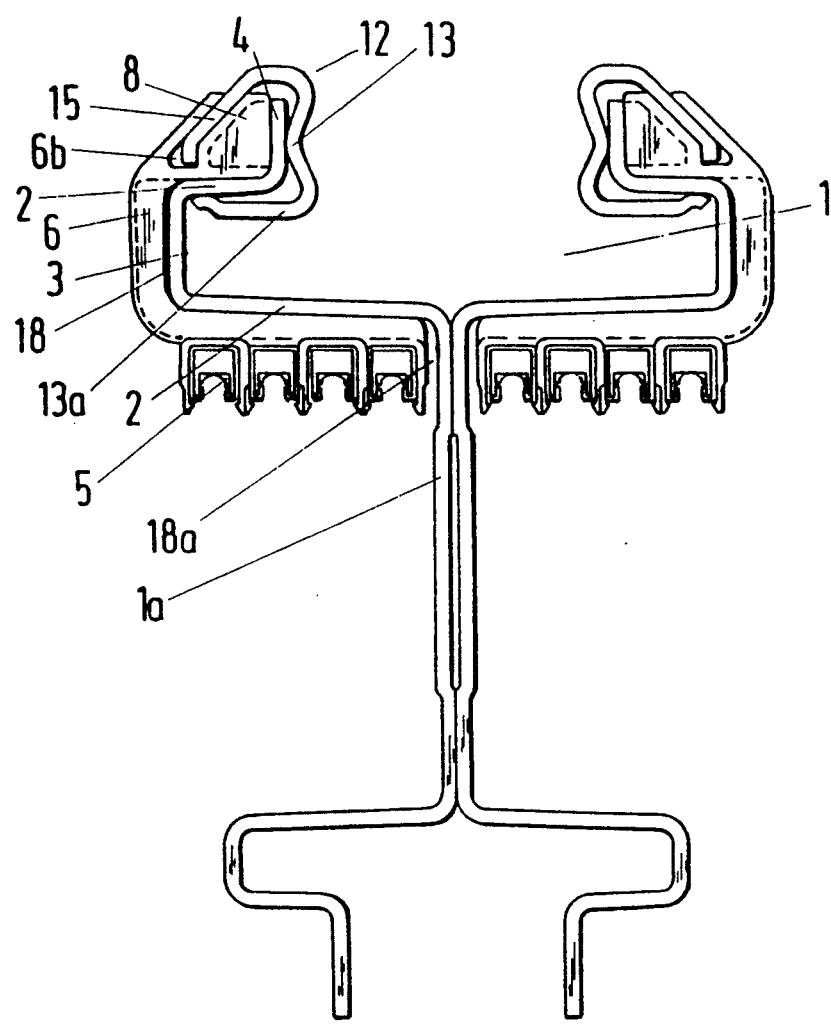
FIG. 4 is a front elevational view of support of beam girder with a different support for a different clamp.

According to the present invention there is provided a support means for current conductor rails disposed at a double T-shaped beam girder welded together from two mirror-symmetrical profiles. A support 6, carrying the current conductor rails, surrounds the top flange of the beam girder 1 and rests with an angled clamping face 7 at an angled holder strap 4 of the top flange. The support 6 is retained by U or V-shaped clamps 12 at the angled holder strap 4 of the top flange.

The current conductor rails 5 can be disposed opposite to the clamping face 7 at the support 6.

The clamp 12 can be furnished with an arm 13 resting at the holder strap 4, wherein the arm 13 grips with a safety nose 14 under a beginning of an edge of a U-shaped guide strap 2.

The clamping face 7 can be furnished with a wedge face 8 narrowing to a tip for a rising arm 15 of the clamp 12.

The rising arm 15 of the clamp 12 can be furnished with a slot 16, extending approximately to the end of the wedge face 8. A safety nose 11 can protrude into the slot 16. The safety nose 11 can be disposed at a cross web 10 between side angle faces 9 of the support 6.

An end edge 8a of the wedge face 8 can reach up to under the safety nose 11 in the cross web 10 by the thickness of a slot bridging web 17 of the rising arm 15.

The clamp 12 can be inserted into a slot 6b of the support 6 disposed parallel to the beam girder 1. The slot 6b cannot be as long as the width of the support 6.

Preferably, the clamp 12 is supported with the arm 13 in the middle of the arm 13 at the holder strap 4 and grips with the lower angled end 13a under the upper guide strap 2, while the rising arm 15 presses onto the wedge face 8 in the slot 6b.

An air gap 18, 18a can in each case be present between an intermediate web 3 of the guide strap 2 and a region of the support 6, disposed adjacent to the guide strap 2 as well as between a tip 6a of the support 6 and a web 1a of the beam girder 1.

The clamp 12 can be produced of steel or of spring steel.

The beam girder 1 is formed symmetrically and from two sheet metal pieces welded together at the ends of the webs 1a. The beam girder 1 is furnished above its web 1a with a bevel or canting for a U-shaped guide strap 2 with an intermediate web 3 and holder strap 4. The support 6 rests with a clamping face 7 at the holder strap 4. The support 6 includes a wedge face 8 comprising three ribs, which can be recognized in FIGS. 1 and 2. A cross-web 10 with a safety nose 11, is disposed in the upper area between the side angle faces 9 of the support 6. The safety nose 11 protrudes into a slot 16 of the rising arm 15 of the clamp 12, as is illustrated in FIGS. 1 and 3.

The clamp 12 is furnished with an arm 13 resting at the holder strap 4. The arm 13 penetrates with a safety nose 14 into the arc towards the guide strap 2 and prevents an unintended lifting of the clamp 12. The clamp 12 is furnished in the rising arm 15 with a slot 16 starting above the holder strap 4 in the arm 13. The slot 16 reaches up to a narrow slot-bridging web 17 of the arm 15. Upon attachment of the clamp 12 at the support 6, the rising arm 15 is slid with the slot-bridging web 17 up to an end edge 8a of the wedge face 8. Thereby the safety nose 11 penetrates into the slot 16. Thereafter, the clamp 12 is canted such that the rising arm 15 rests in the extension of the wedge face 8 and can be slid along the wedge face 8. As a result, the end position is reached with a small pressure and the safety nose 14 catches and engages at the transition to the guide strap 2.

An air gap 18 is present between the support 6 and the web 3 as well as between the tip 6a and the beam girder web 1a, such that it is assured that the support 6 clampingly rests at the guide strap 2.

If desired, the current conductor rails 5, disposed at the bottom side of the support 6, can additionally be disposed in the area of the webs 3.

Figure 5:
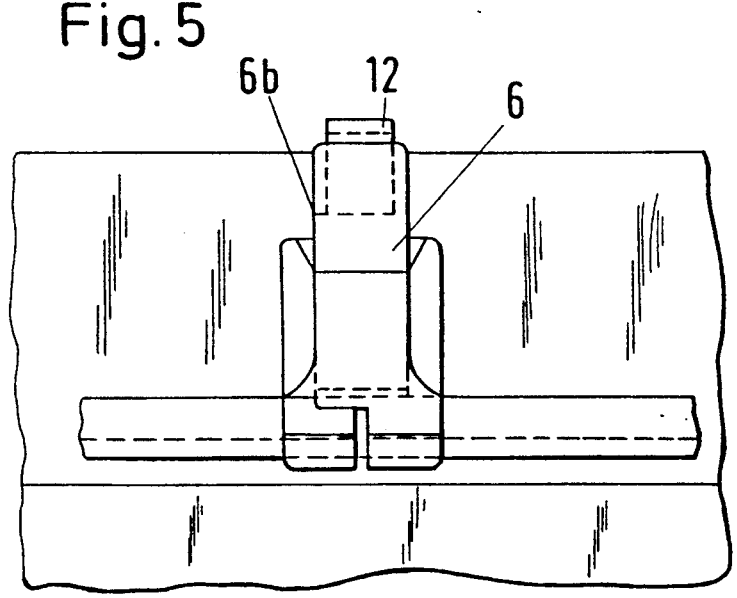
FIG. 5 is a side elevational view of the embodiment of FIG. 4.

According to the embodiment of FIGS. 4 and 5, the support 6 is furnished with a slot 6b for receiving the clamp 12. The clamp is bent in an S-shape in the area of the arm 13 and rests with its center part at the holder strap 4, whereas the angled end 13a engages and grips under the upper guide strap 2. The clamp 12 is slid with the rising arm 15 parallel to the beam girder 1, into the slot 6b of the support 6. The air gap 18 between the support 6 and the web 3 or 1a respectively, can be recognized also in this arrangement.

It will be understood that each of the elements described above, or two or more together, may also find a useful application in other types of rail supports differing from the types described above.

While the invention has been illustrated and described as embodied in the context of a support for current conductor rails, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A support means for current conductor rails, comprising
   a double T-shaped beam girder welded together from two mirror-symmetrical profiles;
   a support carrying current conductor rails and including an angled clamping piece;
   a top flange of the beam girder including a vertical projection, wherein the support carrying the current conductor rails covers the top flange of the beam girder on the outside and rests with the angled clamping piece at the vertical projection of the top flange;

a clamp retaining the support, wherein the clamp is furnished with a first arm engaging the vertical projection of the top flange and is furnished with a second arm shifted over the angled clamping face of the support.

2. The support according to claim 2, wherein the clamp exhibits a U shape.

3. The support according to claim 1, wherein the clamp exhibits a V shape.

4. The support according to claim 1, wherein the current conductor rails are disposed opposed to the clamping piece of the support and wherein a U-shaped recess is disposed between the vertical projection and the flange.

5. The support according to claim 1, wherein the clamp is produced of steel.

6. The support according to claim 1, wherein the clamp is produced of spring steel.

7. The support according to claim 1, wherein the first arm of the clamp is furnished at its end with a safety nose for preventing an unintended lifting of the clamp.

8. A support means for current conductor rails disposed at a double T-shaped beam girder welded togehter from two mirror-symmetrical profiles, wherein a support (6), carrying the current conductor rails, surrounds the top flange of the beam girder (1) from the side like a U and rests with an angled clamping piece (7) at a vertical projection (4) of the top flange, and wherein the support (6) is retained by a clamp (12) at the vertical projection (4) of the top flange, wherein the clamp (12) includes a first arm (13) resting at the vertical projection (4) and a second arm (15) slid onto the support (6).

9. The support according to claim 8, wherein the second arm of clamp (12) can be inserted into a slot (6b) of the support (6) disposed parallel to a longitudinal direction of the beam girder (1).

10. The support according to claim 9, wherein the slot (6b) running in the longitudinal direction of the beam girder is not as wide as the width of the support (6).

11. The support according to claim 8, wherein the clamp (12) is produced of steel.

12. The support according to claim 8, wherein the clamp (12) is produced of spring steel.

13. A support means for current conductor rails, comprising a beam girder welded together from two mirror-symmetrical profiles including a substantially planar web section, a lower guide strap having a first end adjoining and sideways projecting from an upper end of the substantially planar web section and having a second end, an intermediate web adjoining with a first end and projecting upwardly from the second end of the lower guide strap and having a second end, an upper guide strap having a first end adjoining and sideways projecting from the second end of the intermediate web, a vertical projection having a first end joining and upwardly projecting from the second end of the upper guide face and having a second end;

a support carrying current conductor rails and substantially following the contours of the lower guide strap, the intermediate web, the upper guide strap and of the vertical projection and wherein an angled clamping face is disposed adjacent to the vertical projection, wherein the support carrying the current conductor rails covers the vertical projection of the beam girder on the outside and rests with the angled clamping face neighboring the vertical projection;

clamps retaining the support, wherein the clamps are furnished with a first arm engaging the vertical projection and are furnished with a second arm engaging the angled clamping piece of the support.

14. A support means for current conductor rails, comprising a double T-shaped beam girder welded together from two mirror-symmetrical profiles;

a support carrying current conductor rails and including an angled clamping piece;

a top beam flange of the beam girder including a vertical projection, wherein the support carrying the current conductor rails covers the top beam flange of the beam girder and rests with the angled clamping piece at the vertical projection of the top beam flange;

a clamp retaining the support, wherein the clamp captures the top beam flange vertical projection of the beam girder and the angled clamping piece of the support from above like a U and rests with a first clamping face at a stop strip furnished at the top beam flange and with a second arm at the vertical projection.

* * * * *